United States Patent [19]
Hernandez

[11] 3,762,637
[45] Oct. 2, 1973

[54] DUAL-FUNCTION KEYS FOR SIGN CHANGE AND CORRECTION OF ERRONEOUS ENTRIES

[75] Inventor: Jorge Hernandez, Oakland, Calif.

[73] Assignee: SCM Corporation, New York, N.Y.

[22] Filed: Aug. 5, 1971

[21] Appl. No.: 169,257

[52] U.S. Cl. .................. 235/156, 235/160, 340/365
[51] Int. Cl. .......................................... G06f 13/00
[58] Field of Search .................... 235/156, 159, 160, 235/169; 340/365

[56] References Cited

UNITED STATES PATENTS 3,597,600 8/1971 Herendeen ........................ 235/156
3,622,768 11/1971 Clark ................................ 235/160

*Primary Examiner*—Charles E. Atkinson
*Assistant Examiner*—David H. Malzahn
*Attorney*—Armand G. Guibert

[57] ABSTRACT

An electronic calculator of small size with a limited number of keys may include logic such that a second operation of a decimal point key during entry causes a sign change and/or such that operation of a total key during entry only causes a clearance of an erroneous entry and selection of a positive sign.

35 Claims, 11 Drawing Figures

PATENTED OCT 2 1973 3,762,637

SHEET 1 OF 9

INVENTOR.
JORGE HERNANDEZ
BY Armand G. Guibert
His Agent

PATENTED OCT 2 1973

3,762,637

SHEET 5 OF 9

DUAL-FUNCTION KEYS FOR SIGN CHANGE AND CORRECTION OF ERRONEOUS ENTRIES

BACKGROUND OF THE INVENTION

This invention relates to calculating devices and particularly to very small electronic calculators able to perform all four basic arithmetic operations, yet small enough to be inserted in a shirt pocket, for instance. While small electronic calculators that are portable and can be hand held have been known, the problem of producing a calculator small enough to be put in a shirt pocket has heretofore been limited by the size of the logic elements, power supplies, etc. With the advent of the MOS chip technique, the controlling factor has shifted from the logic elements to the physical size of the display and the keyboard, the spacing between keys being determined strictly by human design factors and this spacing thus making it impossible to provide a sufficient number of control keys in the limited area available.

Accordingly, it is an object of this invention to provide for all the usual controls with a limited number of keys. In prior art calculators, for example, the depression of a decimal point key would solely effect the insertion of a decimal point in a number entered into a register. If the decimal point key were depressed twice during an entry, either a new decimal point would be entered (the logic being such as to interpret the operator's action as indicating that the previous decimal point key depression was erroneous), or the second decimal point key depression would be ignored (being interpreted by the logic as an error, caused by the operator's inadvertent displacement of his hand, for example). Structure of the first kind is shown in U. S. Pat. No. 3,518,629 assigned to the same assignee, and structure of the second type is shown in U. S. Pat. No. 3,021,066. Similarly, depression of a total key subsequent to the depression of digit keys and prior to the depression of any one of the four arithmetic function keys would be interpreted as an error in the operation of the machine and the instruction would be ignored since the taking of a total during an entry would clear out a partial sum to which the operator might have intended to add the entry in the keyboard.

BRIEF SUMMARY OF THE INVENTION

The invention comprises the provision of memory means to store the fact that there has been depression of a decimal point key and/or the depression of digit keys, such that the subsequent depression of the decimal point key for a second time during entry of the digits of a number can be used as an indication that the operator's intent is to change the sign of the number entered, that is, assuming that all numbers are normally entered positively, the operation of the decimal point key under these conditions will cause a change of the register sign to a negative indication or to the complement of the existing state. As another application of the basic concept of alternative interpretation of the significance of a particular key depression in dependence on preceding depression of a digit key (or other key signifying a new entry), the depression of the total key under conditions where there has been depression of one or more digit keys, but no depression of any of the arithmetic function keys, then results in clearance of the partial entry corresponding to the digit keys depressed and selection of a positive value for the sign. If the total key is depressed under conditions where there has been no entry whatsoever to the keyboard register, then the key operates in normal fashion.

Figures 1, 2:
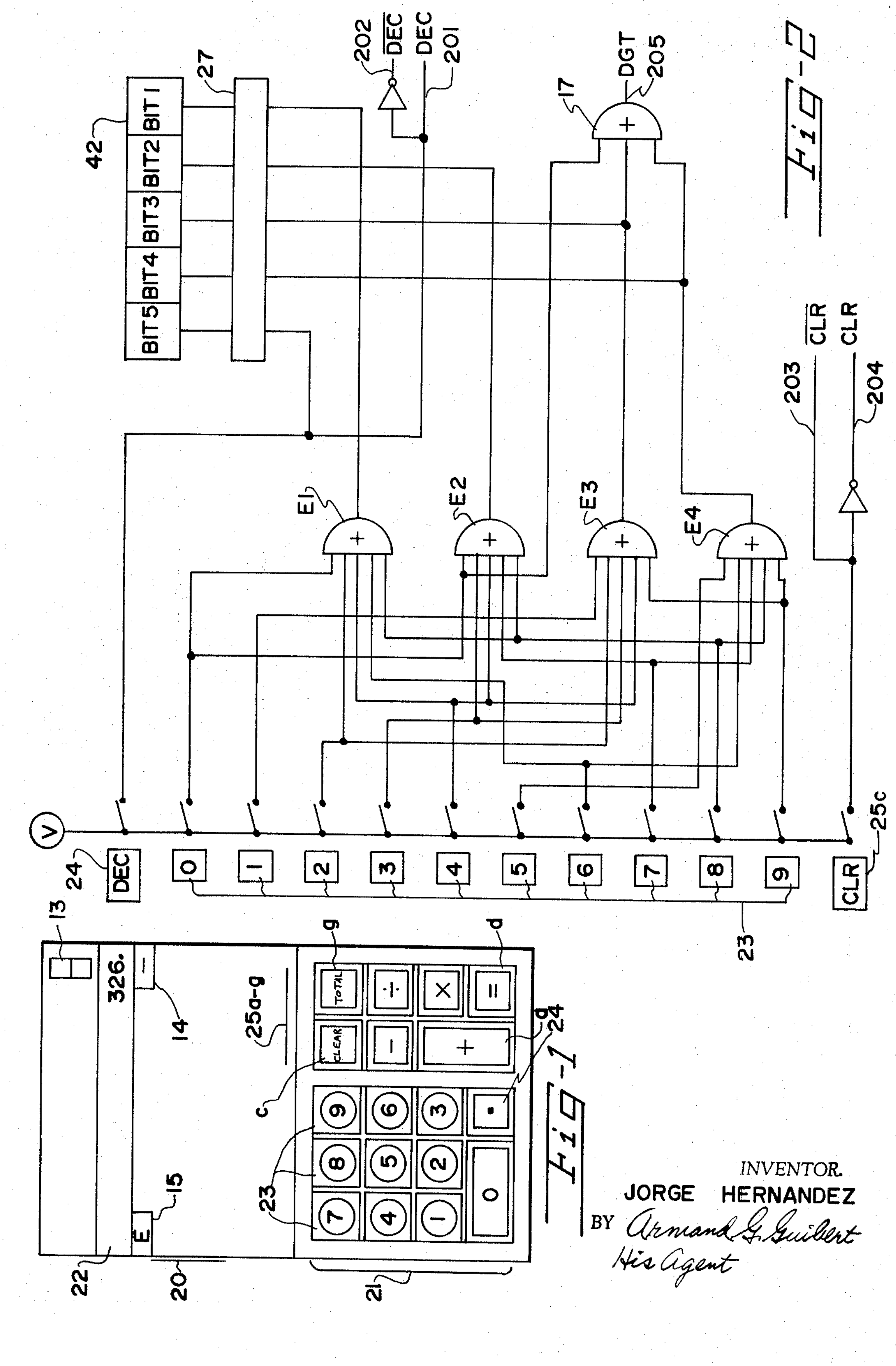
FIG. 1 is a top plan view of a miniature calculator, including a keyboard and a visual display, the keyboard having on its left a plurality of digit keys and a combination decimal point and sign control key according to particular embodiments of the invention and on its right having a plurality of function control keys, some of which may also be combination keys according to other embodiments of the invention.
FIG. 2 is a diagram of the circuits actuated by depression of the digit, decimal point and clear keys of FIG. 1.

Before beginning the description of the embodiments, it should be noted that in the figures all two-digit reference numerals indicate elements identical to those in a co-pending U.S. application Ser. No. 129,100 identified in greater detail subsequently. Furthermore, for simplicity and ease of location, in all other reference numbers, the leftmost digit in three-digit numbers (or the two leftmost digits in four-digit numbers) identify the figure in which that element is first found.

In the flow diagrams, moreover, the boxes represent sequence states in which the indicated actions take place under the conditions given, while a diamond represents branch points controlling the sequence path according to the "truth" of the indicated condition, whereas inverted triangles represent performance of the indicated action during transition from a given state. In the logic diagrams, the hemispheres represent gates, an internal dot signifying an AND gate, an internal "plus" signifying an OR gate, a tangential circle on the input or output side of a gate indicating signal inversion (a "NOR" or "NAND" gate) and a large arrowhead with a circle at the tip indicating an inverter. The particular elements chosen for the embodiment described herein were selected for simplicity of explanation, it being recognized that equivalent results can be obtained by inversion of signals and use of NOR/-NAND logic where it suits a designer's needs under restrictions of cost, size, etc. The blocks labeled "Stream Selectors" comprise "Mutually Exclusive" combinations of gates, such that only one data input will be permitted to pass, others being blocked.

DESCRIPTION OF THE PREFERRED EMBODIMENTS

Basic Calculator

Figure 3A:
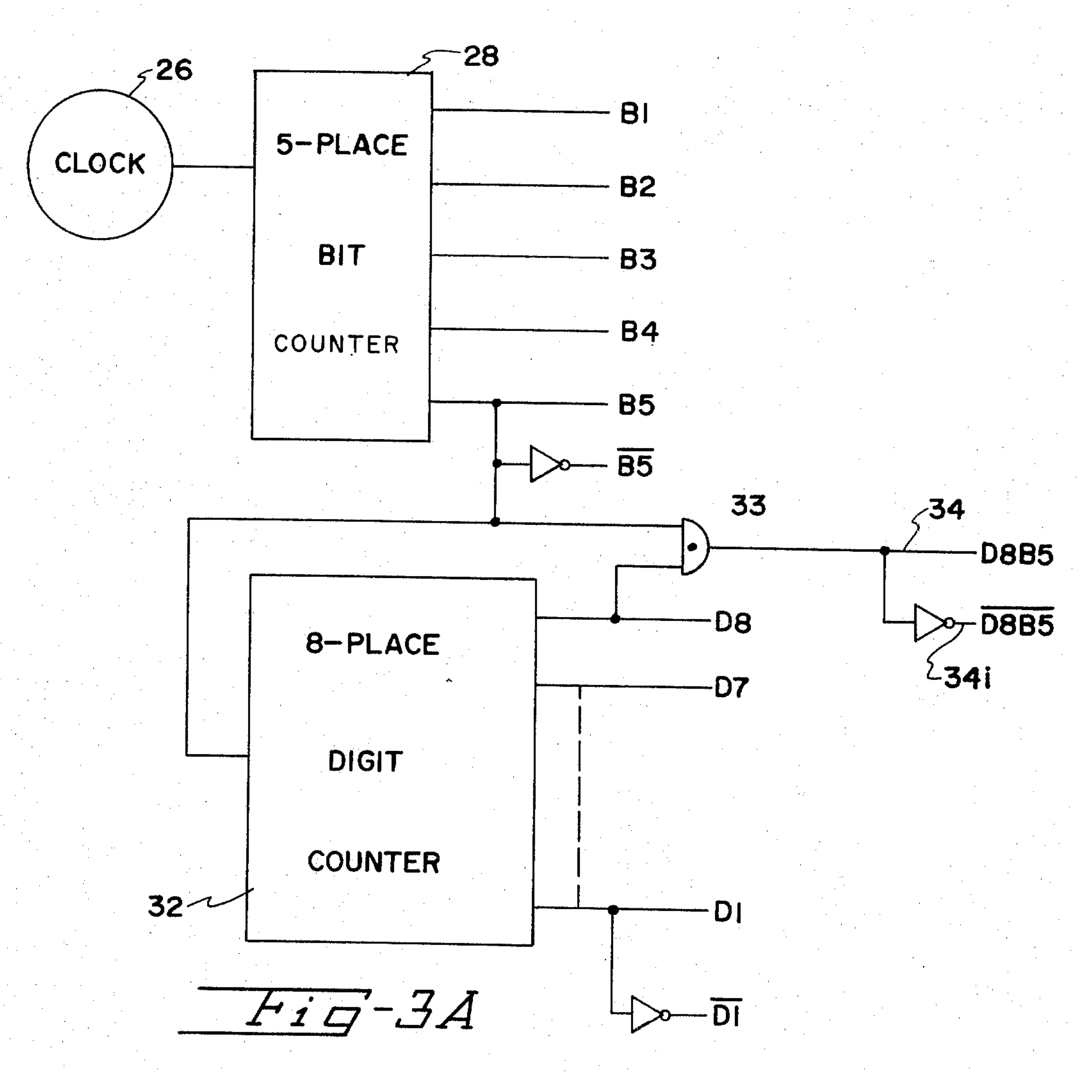
FIG. 3A is a block diagram of timing signal generation for each bit and digit of an eight digit calculator to which exemplary embodiments of the invention are applied.

The embodiments of the invention will be described as applied to a particular four-species calculator, for simplicity of explanation, although the invention can be applied to other calculators having different logical design as will be evident to those skilled in the art. The particular calculator chosen is that described in co-pending U. S. application Ser. No. 129,100, filed Mar. 29, 1971, entitled "Extra Bit for Floating Decimal Control and Correction of False Intermediate Arithmetic Results," invented by Han Kuijsten and assigned to the same assignee. That calculator, shown in generalized plan view in FIG. 1, has an eight-digit capacity for each of four registers, including a keyboard register in which all entries are made. The keyboard register of that calculator is the only register with contents read out to display means 22, such as neon digital display tubes. Each ordinal digit is stored in the form of a five-bit code, the fifth bit position being for storage of a decimal point in the appropriate order, as shown in FIG. 2 (and for other purposes, as described in the co-pending application, but disregarded here as not pertinent to the present invention). In the calculator chosen, the appearance of each bit of each digit is timed to take place successively in a bit-serial, digit-serial manner. Thus, first the bits for the first, least significant, digit of a register are read out and re-entered in serial order, at times D1B1, D1B2, . . . D1B5, and then the same bits for the next digit are read out and re-entered serially at times D2B1, D2B2, . . . D2B5 and so on through all the digits to D8B5, corresponding to the last bit of the eight digits of the calculator chosen. The digit and bit time signals are developed by appropriate gating of signals from corresponding counters 32 and 28, which are timed by a clock generator 26, as shown in FIG. 3A. At D8B5 time, therefore, one memory cycle has been completed.

Timing is important, as in all electronic calculators, and there is one bit of delay at each bit of each digit, so that D1B5 corresponds to the fifth bit of delay after initiation of a memory cycle, i.e., just before D2B1, and D8B5 corresponds to the fortieth bit of delay. KNB1, KNB2, KNB3, KNB4, KNB5 represent specifically the five bits in the Nth K register digit, and so on. A bit of delay is indicated in the drawing by the Greek Letter: capital delta (Δ); so 5 Δ means five bits of delay, and 35 Δ means 35 bits of delay. The "bit delay" or delta may also be defined as unit clock time delay, the output of generator 26, and this can be obtained in various ways (a "two-phase" system in MOS technology, for example).

As to sequence controls, the calculator chosen for incorporating the invention uses four flip-flops (not shown, but referred to as S1 . . . S4 and being weighted according to the 1-2-4-8 code) to distinguish in known fashion the various conditions of operation. The calculator performs its operations by means of routines which involve progression through a succession of states, each identified by a particular combination of settings of the four flip-flops. Each routine is controlled by a signal initiated upon depression of one of the keys in keyboard 21, and one routine, termed "ICC," is initiated upon turning on power to the calculator switch 13 at upper right in FIG. 1 and serves to set the calculator into a rest or "ready" state in known fashion. The various embodiments of the invention will be presented in terms of the entry routine of calculator 20, which will be described briefly first.

Entry of Digits (FIGS. 2 and 4, 6, or 8)

Figure 4:
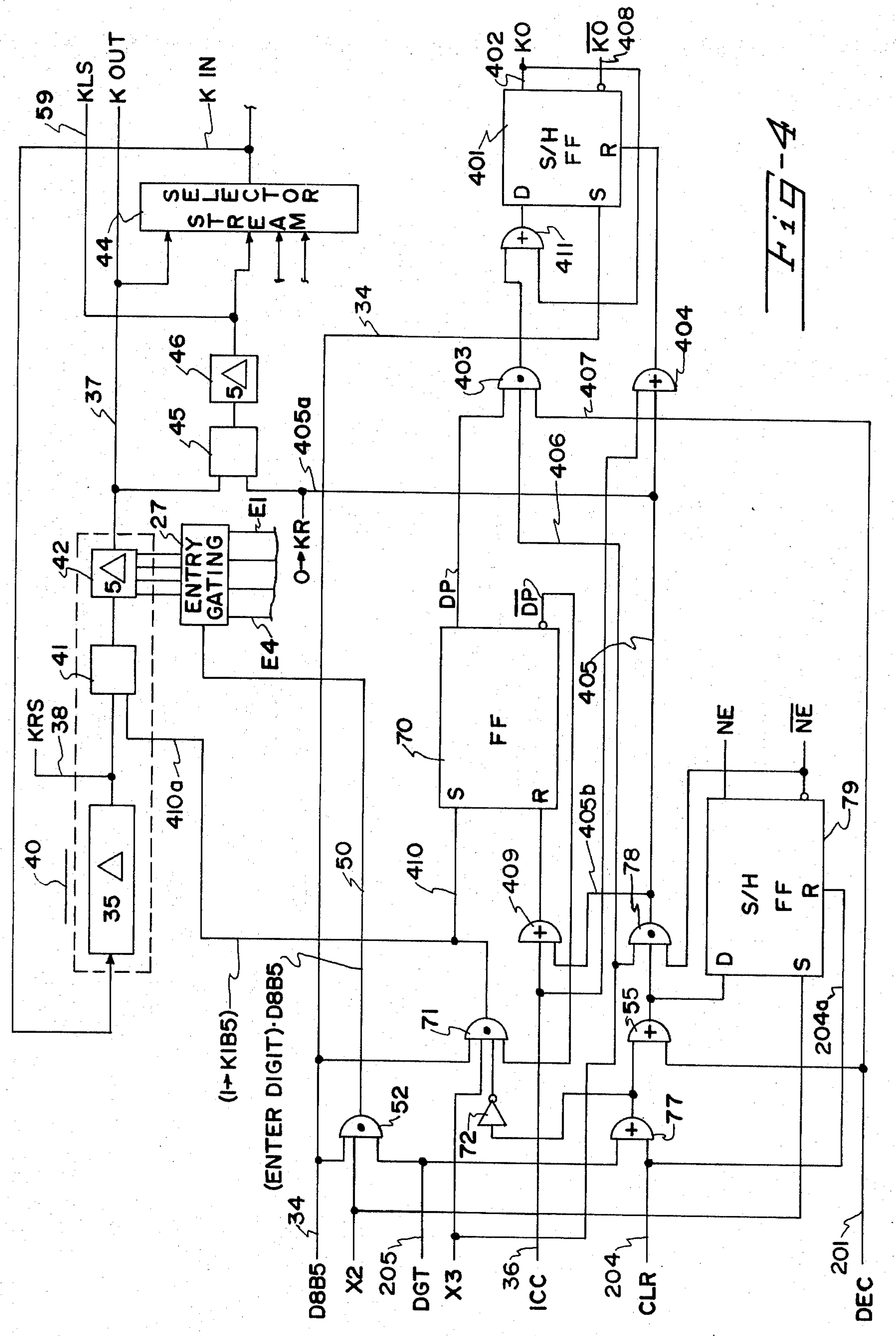
FIG. 4 is a logic diagram of a first embodiment of the invention utilizing the decimal point key alternatively for negative sign entry.

The entry of digits via keyboard 21, as shown broadly in FIGS. 2 and 4 (6 and 8 being substantially identical in this respect), is always into a keyboard register called the K register (although the invention also applies to calculators where entry can be made selectively into any one or more of a number of registers, as described in U. S. Pat. No. 3,518,629, for instance). Each digit of a number is immediately transferred into K register, hereinafter referred to as K Reg., upon pressing the corresponding digit key 23. Thus, a number such as "326.," displayed as in FIG. 1, will be entered as read from left to right via the ten digit keys 23 and the decimal point key 24 of keyboard 21. The digit 3 will initially be stored in the first order or digit position (D1 time) of K Reg. Upon entry of the digit 2, the digit 3 shifts to the second order (D2 time) of K Reg. and the 2 appears at the first order or digit position (D1 time). The 6 appears in the first order of that register when that key 23 is depressed, previous information again shifting left. Upon depression of decimal point key 24, there is no shift, but the decimal point appears to the right of the 6. The decimal point is thus entered in the fifth bit position of the first order, but displayed to the right of that order, as described in greater detail in co-pending U.S. application Ser. No. 129,100, when the key 24 is depressed or automatically when a function key 25*a*, *b*, *d–g* is depressed, provided the decimal point key 24 was not depressed previously during that entry.

Figure 6:
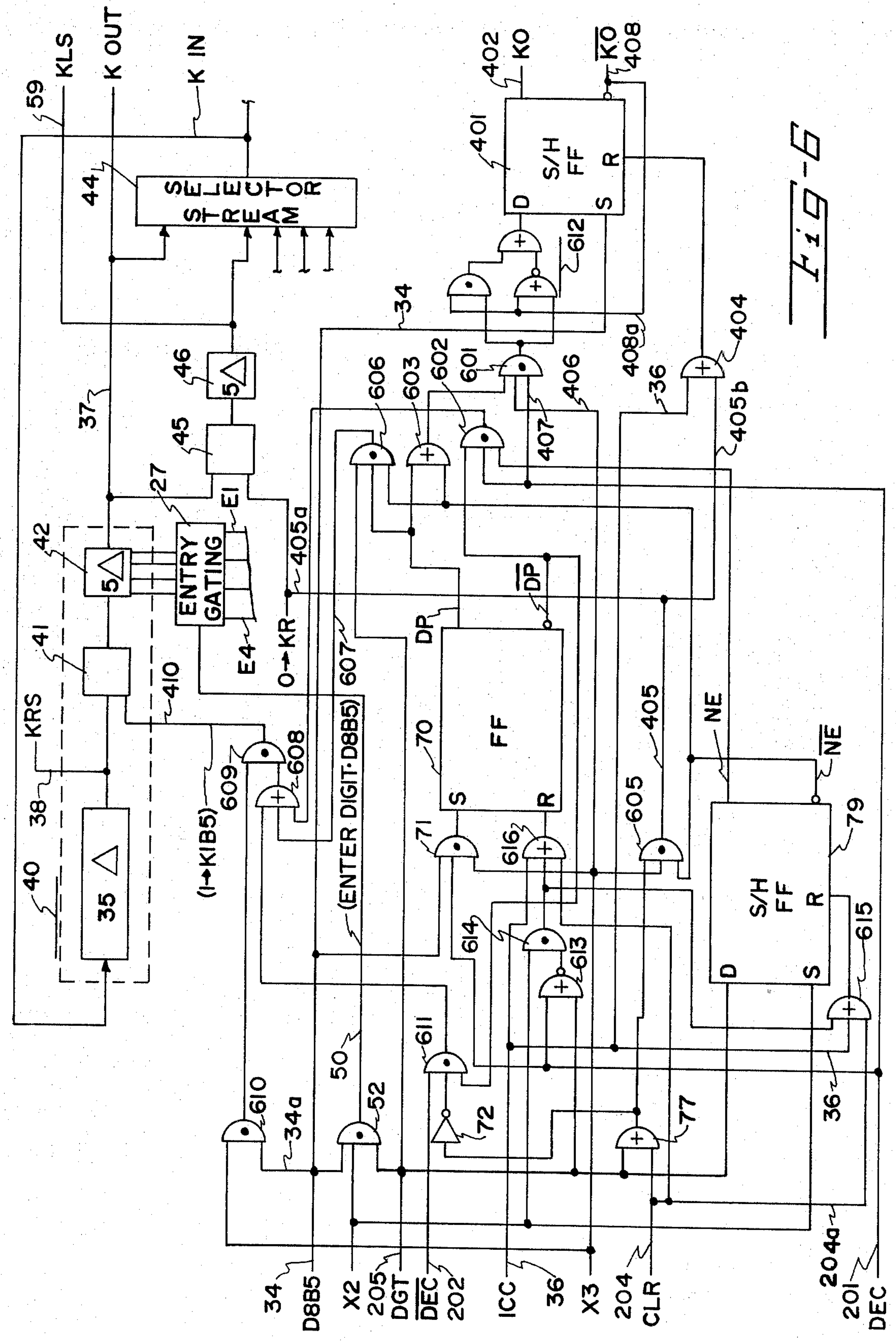
FIG. 6 is a logic diagram of a second embodiment of the invention utilizing the decimal point key alternatively as a sign change key.
Figure 8:
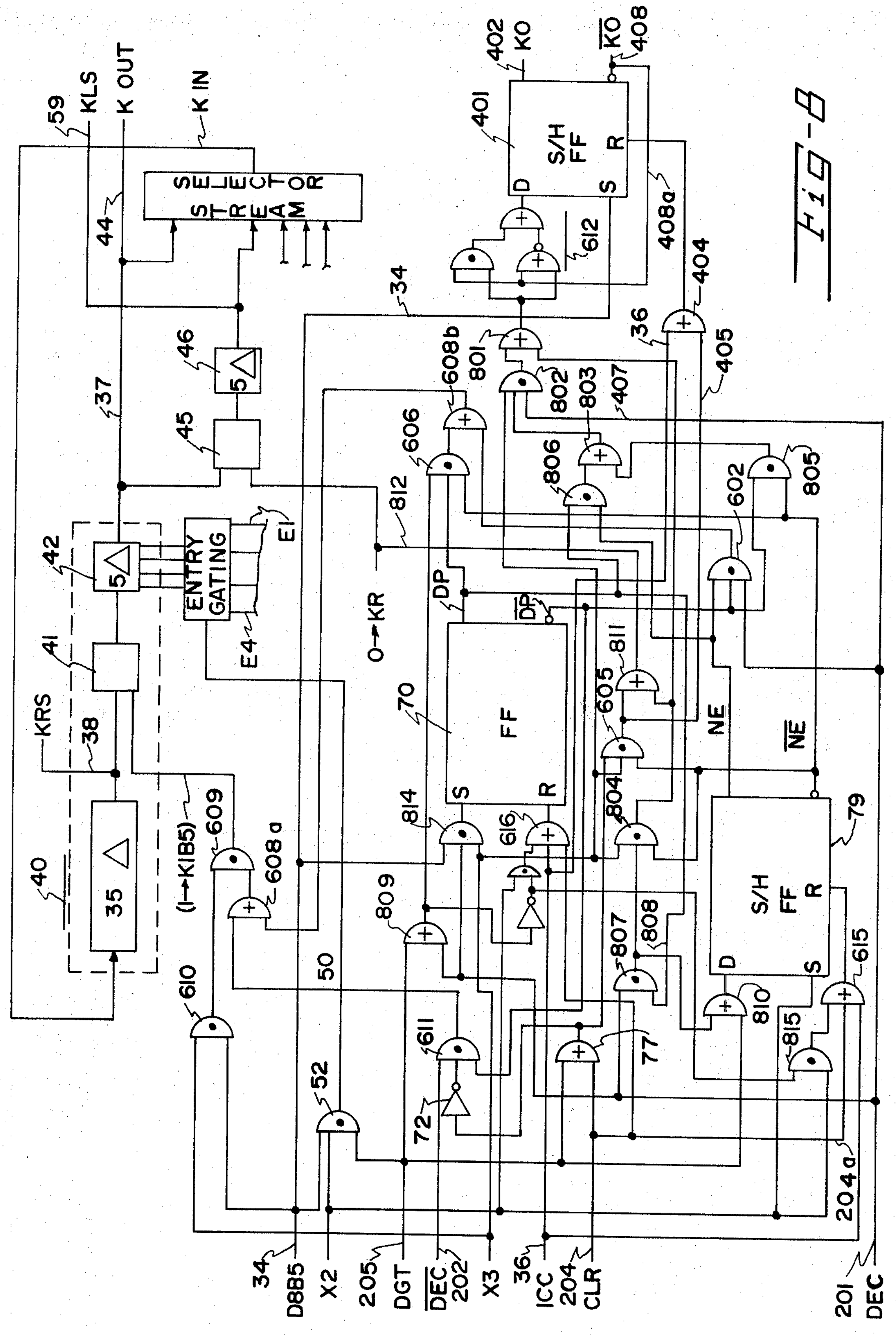
FIG. 8 is a logic diagram of a third embodiment of the invention utilizing the decimal point key substantially as in the second embodiment except that an initial pair of successive depressions of that key result in entry of both a decimal point and a sign change.

Before discussing the actual entry, consider the keyboard memory circulation, shown at the top in each of FIGS. 4, 6, and 8. There, the series of data signals "K In" goes to the input of the K Reg. 40, comprising, for example, an initial 35 bit dynamic shift register portion having an output tap KRS 38 for right shift of data emerging from the dynamic memory. The KRS signal and the (Enter DEC).D8B5 signal (described subsequently) go to a gating element 41 and from there to a further five-bit dynamic shift register 42, comprising the remaining five bits of the 40 needed for storage of eight five-bit digits. Normally, the "K Out" signal from shift register 42 goes directly to a stream selector 44 and thence to the input of shift Reg. 40, K In. For left shift, K Out may also go through a logic circuit 45 (where "0" digits may be inserted) to another five-bit dynamic shift register 46 for a left shift, and thence to the stream selector 44, all as explained in above mentioned co-pending U.S. application Ser. No. 129,100. The other memory registers of the calculator are substantially identical to K Reg. in structure, but have different stream selectors, of course, and need not be discussed specifically here.

Figure 3B:
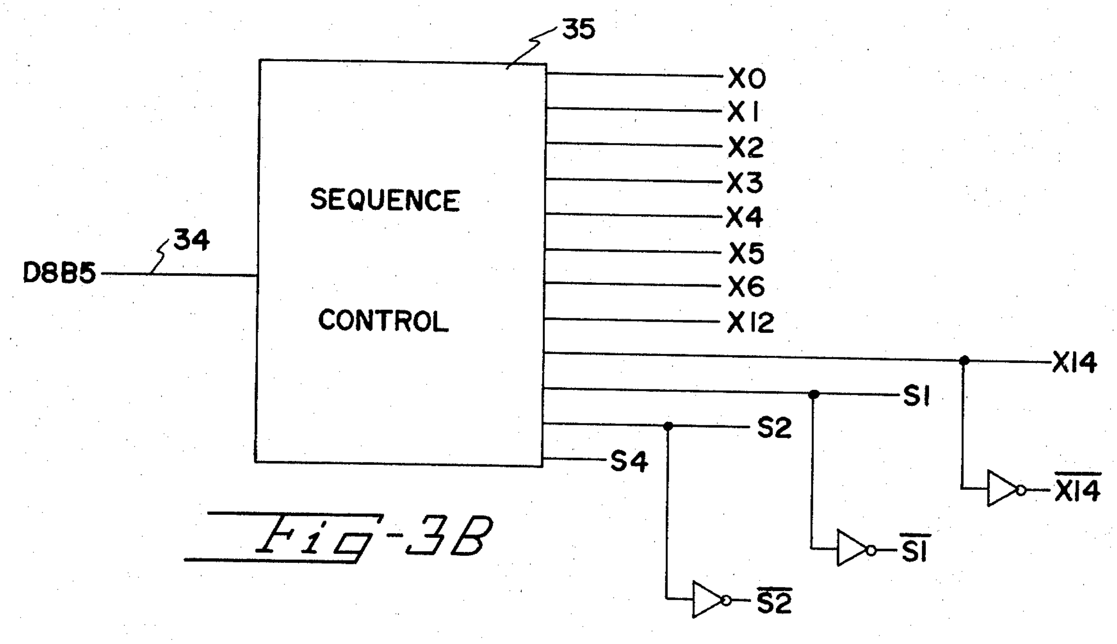
FIG. 3B is a block diagram of the generation of sequence control signals for use in the calculator to which exemplary embodiments of the invention are applied.
Figure 5:
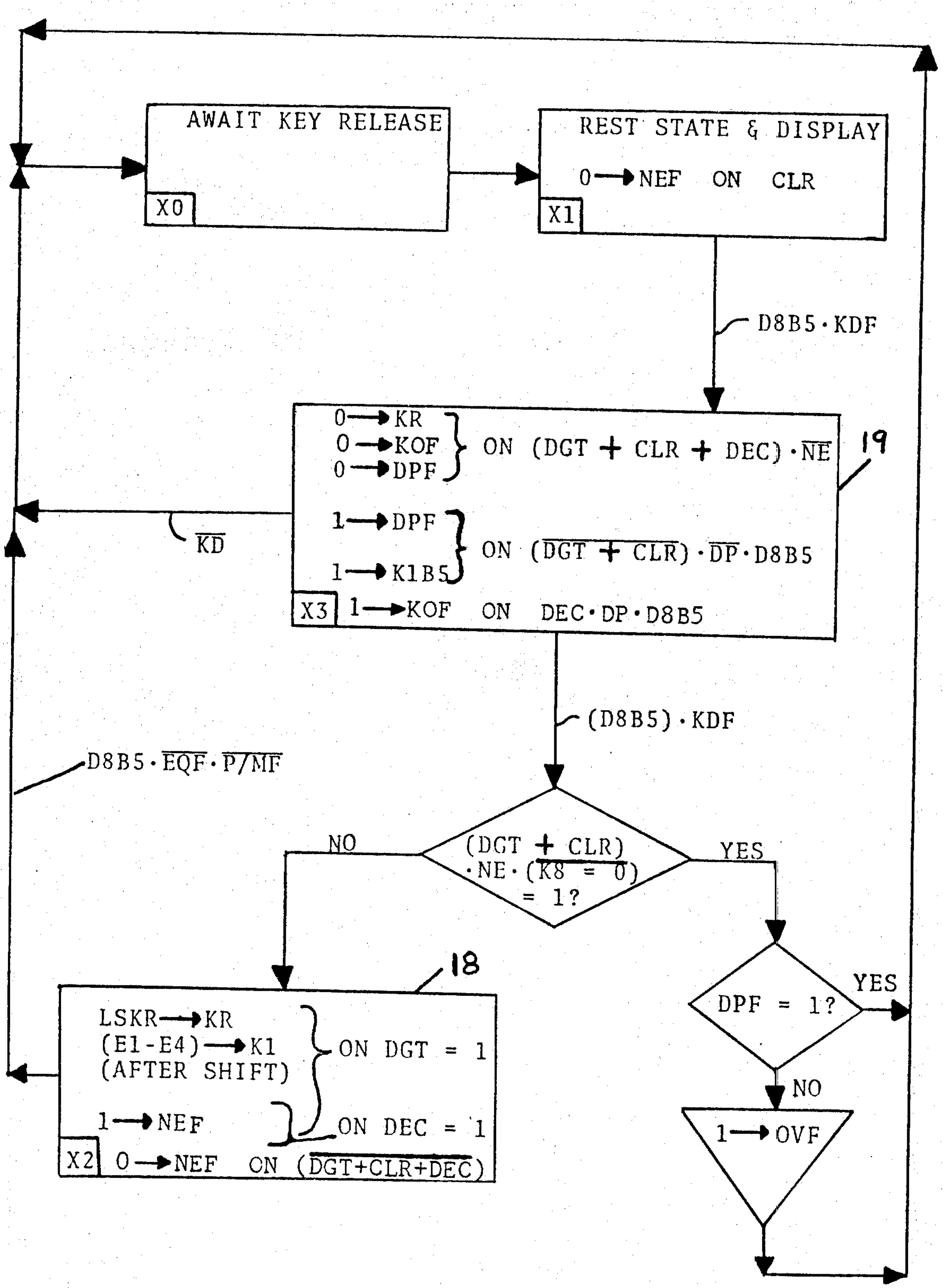
FIG. 5 is a block diagram of an entry routine modified according to the first embodiment and defining the functions provided by the structure of FIG. 4.

From the foregoing, it is evident that information circulated in K Reg. 40 can be shifted left and, in particular, that if depression of a digit key 23 causes a left shift prior to entry of the bits of that digit into the buffer register 42, then all previously entered digits will be to the left of the latest entry and a "zero" entered into the rightmost digit position of K Reg. during that shift will provide the necessary space for entry of this next digit, as expressed in the Entry Routine flow chart of FIG. 5. There it will be noticed from box 19, which corresponds to the state X3 of Sequence Controls 35 of FIG. 3B, that K Reg. 40 is cleared in that state on depression of any digit key (23 in FIGS. 1 and 2) or the decimal point key 24 corresponding to the first digit of a new number. Similarly, from box 18 of FIG. 5, corresponding to state X2, it is seen that in state X2 there is first a left shift of K Reg. contents (LSKR) and then entry of the digit into the K1 position after the shift, if the key depressed was a digit key 23. A "New Entry" flip-flop NEF (79 in FIG. 4) is used to mark the fact that a digit forms part of a new entry, and is "set" in state X2 provided the key depressed was one of the digit keys 23 or the decimal point key 24. On the other hand, if one of the function keys 25*a–g* was depressed, flip-flop 79 will be "reset" in state X2 in preparation for detection of the first digit of the next number entered, which again must be accompanied by a preclearance performed in state X3. This resetting of flip-flop 79 does not occur through the reset input on line 204*a*, but through the sample and data inputs, S and D respectively, of flip-flop 79, since there is no signal from OR gate 55 upon operation of any of the keys 25*a,b,d–g*. Because operation of these keys does cause the sequence to pass through state X2, however, resultant sampling of the "zero" data input will then reset flip-flop 79.

For entry of the code bits of the particular digit key 23 depressed, the gating 27 is enabled upon occurrence of the "Enter Digit" signal at D8B5 time on line 50 to send corresponding bit signals to the five-bit shift register 42. The "Enter Digit" signal is probided upon depression of any key 23 by means of the "Digit" OR gate 17 (FIG. 2) which then gives an output on line 205 supplied to a three-input AND gate 52 (FIG. 4) having as its other inputs the state X2, and the D8B5 signal on line 34 for timing, in known fashion and as described in greater detail in co-pending U.S. application Ser. No. 129,100. D8B5 is provided (FIG. 3A) through a two-input AND gate 33 having as one input the eighth stage of digit counter 32, which advances from one stage to another at the end of each fifth bit, and the B5 stage of the bit counter 28 at its other input.

The decimal point entry in calculator 20 incorporates a decimal point flip-flop 70, the purpose of which was to make sure that only one decimal point was entered per number according to the disclosure of co-pending U.S. application Ser. No. 129,100. Once a decimal point had been entered, no other decimal point could be entered, either manually or automatically, relative to any other digit of the number. As stated though, if no decimal point was entered at all, there would be an automatic entry at the rightmost digit upon depression of a function key, but this was suppressed if manual entry had already occurred. A second depression of the key 24 can be used, however, to cause a negative sign indication for the register entry, or a reversal in the sign indication, according to alternative embodiments described subsequently.

As part of the original decimal point entry system, there is shown in FIG. 4 automatic decimal point entry logic comprising an AND gate 71, fed by four signals, the first of which is the D8B5 signal, the second of which may be called "First Active State" (state X3), this being a state activated by the depression of any key, including a digit key 23 and remaining activated (i.e., in the "1" state) for one cycle such that preclearance, if needed, can be completed. The next element feeding AND gate 71 is an OR gate 77 to which are fed two circuits, one activated by depression of any digit key 23 and the other by depression of the "Clear" key 25c. In order for AND gate 71 to pass a signal, this OR gate must give a signal which indicates — after passage through an inverter 72 — that the key depressed was neither a digit key nor a clear key, ergo that the key was one of the function keys 25*a–g* or the decimal point key 24. Finally, the fourth input to AND gate 71, $\overline{DP}$, is an enabling signal obtained by inversion of the output of decimal point flip-flop 70.

When a signal passes through AND gate 71, it goes to the decimal point entry logic block 41 and also goes to the decimal point flip-flop 70, a recirculating or dynamic flip-flop, having a normal and inverted output, as is customary, the latter supplying the signal $\overline{DP}$ back to AND gate 71. During entry of any number, this decimal point flip-flop is initially in the reset state, having been put in that state by an "Initial Clearance " signal on line 36 (generated in the ICC routine mentioned earlier) which operates in known fashion to clear all registers and reset all flip-flops as soon as switch 13 is operated to turn on calculator 20, or by a preclearance signal circuit now to be described.

As seen from the rules in box 19 of FIG. 5, preclearance of K Reg. 40 is required upon the first depression of a digit key 23 or decimal point key 24 after depression of a function key 25*a–g*, a set of circumstances marked by depression of a digit key 23 or decimal point key 24 with "New Entry" flip-flop 79 in its reset state. Such depression of a digit key 23 signals that a new number is being entered and not only that the previous factor or result must first be cleared, but also that the decimal point flip-flop 70 must be reset. This is accomplished through the circuit (FIG. 4) which includes OR gates 77 and 55, fed by depression of any digit key 23 or "Clear" key 25*c* or decimal point key 24. These OR gates supply an AND gate 78, the output of which effects the desired clearance of K Reg. 40 and resetting of flip-flop 70, respectively (via lines 405 and 405*a*). In order to be activated, gate 78 requires a "true" signal from the first active state, X3, mentioned before, and from the inverted output side of the "New Entry" flip-flop 79. This flip-flop is of the "Sample and Hold" type and one of its purposes is to prevent more than one preclearance of K Reg. 40 during entry of a number. Subsequent depression of keys 23 (or 24, if not depressed initially) for the second and further digit entries must not be accompanied by a clearance of K Reg., obviously, so this is prevented in known fashion by setting flip-flop 79 upon entry of the first digit of the number and resetting it upon depression of a function key 25*a–g*, preclearance being performed in state X3 and being permitted only when flip-flop 79 is in reset condition and a key 23, 24 is depressed, as shown by the inputs to AND gate 78.

Before dropping consideration of flip-flops 70 and 79, it should be noted that the former is set — according to the foregoing description — upon manual depression of the decimal key 24 or automatically upon depression of a function key 25*a–g*, yet only one AND gate 71 is shown as sufficient for the purpose. The reason for this is that the inverted output of OR gate 77 is true whenever the state X3 is associated with a routine initiated by depression of a key other than a digit key 23 or a clear key 25*c*, i.e., it is true on depression of a function key 25*a,b,d–g* or the decimal point key 24. As to flip-flop 79, it will be noted that the signal for resetting the latter flip-flop is generated by depression of the clear key 25*c*, yet setting occurs on a signal through OR gate 55 coming from OR gate 77 which gives an output whenever clear key 25*c* is pressed. This causes no problems because the reset input dominates in Sample and Hold flip-flops, as stated in co-pending U.S. application Ser. No. 129,100.

Negative Sign Control

The sign of the keyboard Reg. 40 must be stored in one (or more) storage elements which may be either a part of related numeric register, or a separate flip-flop(s), as is well known. In the MOS type of circuitry, it is preferred to use a flip-flop, such as the Sample and Hold flip-flop 401 shown in FIG. 4. This flip-flop will henceforth be referred to as the "KOF" flip-flop and when its output KO on line 402 is a "zero" (false) this is an indication that the sign of the register contents is positive. Conversely, when the signal on line 402 is a "one" (true), then this is an indication that the sign of the register contents is negative. In order to provide for change of the sign of an entry from positive to negative, a second depression of the decimal point key is used for this purpose according to the first embodiment of the invention, distinguishing over the known art, where such second depression either sets the decimal point at a new location following the immediately preceding digit or is ignored as being an erroneous operation.

In the structure of co-pending U.S. application Ser. No. 129,100, which is of the latter type, the decimal point flip-flop 70 is used for distinguishing between the first and succeeding depressions of the decimal point key 24, as described above. Flip-flop 70 is put in the reset state upon initiation of a new entry after any operation caused by the depression of an arithmetic, clearance or transfer key 25*a–g* (or possibly is reset upon depression of any one of the latter keys, as will be discussed later), and is set upon depression of the decimal point key 24 during entry of a new number into keyboard Reg. 40. Conditions for resetting of flip-flop 70 are shown by the flow chart of FIG. 5, which is substantially identical to FIG. 5 of the above-mentioned co-pending application except for the events which occur in state X3, box 19— namely, the resetting of KOF, the sign flip-flop, shortly after entering state X3, and the setting of KOF to a "one") on a signal indicating a second depression of the decimal point key —) as will be described If the first key depressed during a new entry is the decimal point key DEC (24) — that is, if the number is a fractional number — the decimal point flip-flop DPF (70) is still reset at the beginning of state X3, but becomes a "one" at the end of that state, as shown by the term D8B5 in the expression for "1 → DPF" in box 19. Thus, even in this case a second depression of the decimal point key DEC (24) can be differentiated by the fact that the signal from the DPF flip-flop (70) will be a "one" when such a depression occurs. In all other cases, after depression of the first digit key DGT (23) of a new entry, flip-flop 70 will still be at zero.

Structure implementing the negative sign control specified in box 19 of the flow chart of FIG. 5 is shown in FIG. 4, where at X3 time (during which time preclearance and decimal entries are performed, as described in co-pending U.S. application Ser. No. 129,100), if flip-flop 70 has already been set by depression of the decimal point key 24 and that key is once again depressed, then — according to the first embodiment of the invention — through a three-input AND gate 403, a "one" input will be supplied to flip-flop 401 through OR gate 411 when the "sample" signal is received at the input S of flip-flop 401 at D8B5 time. Flip-flop 401 will thus be set when AND gate 403 has all three of its inputs "true." This condition occurs when there is a "one" on the "DP" output of flip-flop 70, a "one" on line 406 connected to the X3 output of Sequence Control 35, and lastly, a "one" on line 407 (connected to DEC, line 201) when operation of the decimal point key 24 closes its associated switch (FIG. 2). Thus, the sign of the register contents will become negative as a result of the second depression of decimal point key 24. The "one" signal on line 402 can be used to enable a lamp driver circuit of known configuration such that illumination of the negative sign indicator 14 of FIG. 1 will show the operator that the number displayed is a negative quantity.

As can be seen from box 19 of FIG. 5 and from the structure of FIG. 4, further depressions of decimal point key 24 thereafter merely cause the setting of flip-flop 401 anew with no outwardly visible effect. Once set, flip-flop 401 remains in that state until the clear key 25*c* is depressed or some functional operation has been performed and subsequent thereto a digit key 23 or decimal point key 24 is depressed to indicate start of a new entry. This is also evident from box 19, where $0 \rightarrow$ KOF is one of the actions required upon $(DGT+CLR+DEC)\times\overline{NE}$. In this respect, it will be noted that flip-flop NEF will be reset if the clear key 25*c* is depressed. It will also be reset in state X2 if any key of keyboard 21, other than one of the three mentioned immediately above, was depressed. Subsequent to such resetting of flip-flop NEF, the conditions are appropriate for resetting KOF as called for by box 19. The structure for this is shown in FIG. 4 and comprises connection of the output of AND gate 78 (previously described with respect to preclearance of K Reg. 40 and resetting of the decimal point flip-flop 70), via line 405 to one input of a two-input OR gate 404, the output of which connects to the reset input of flip-flop 401. It will be noted as a general comment that the other input to OR gate 404 comes from a line 36 which carries the signal ICC, one generated momentarily upon supplying power to the calculator by operating switch 13, as mentioned earlier, and used to insure that the calculator is always in state X1, ready for a new calculation, as soon as the calculator is turned on.

Figure 7:
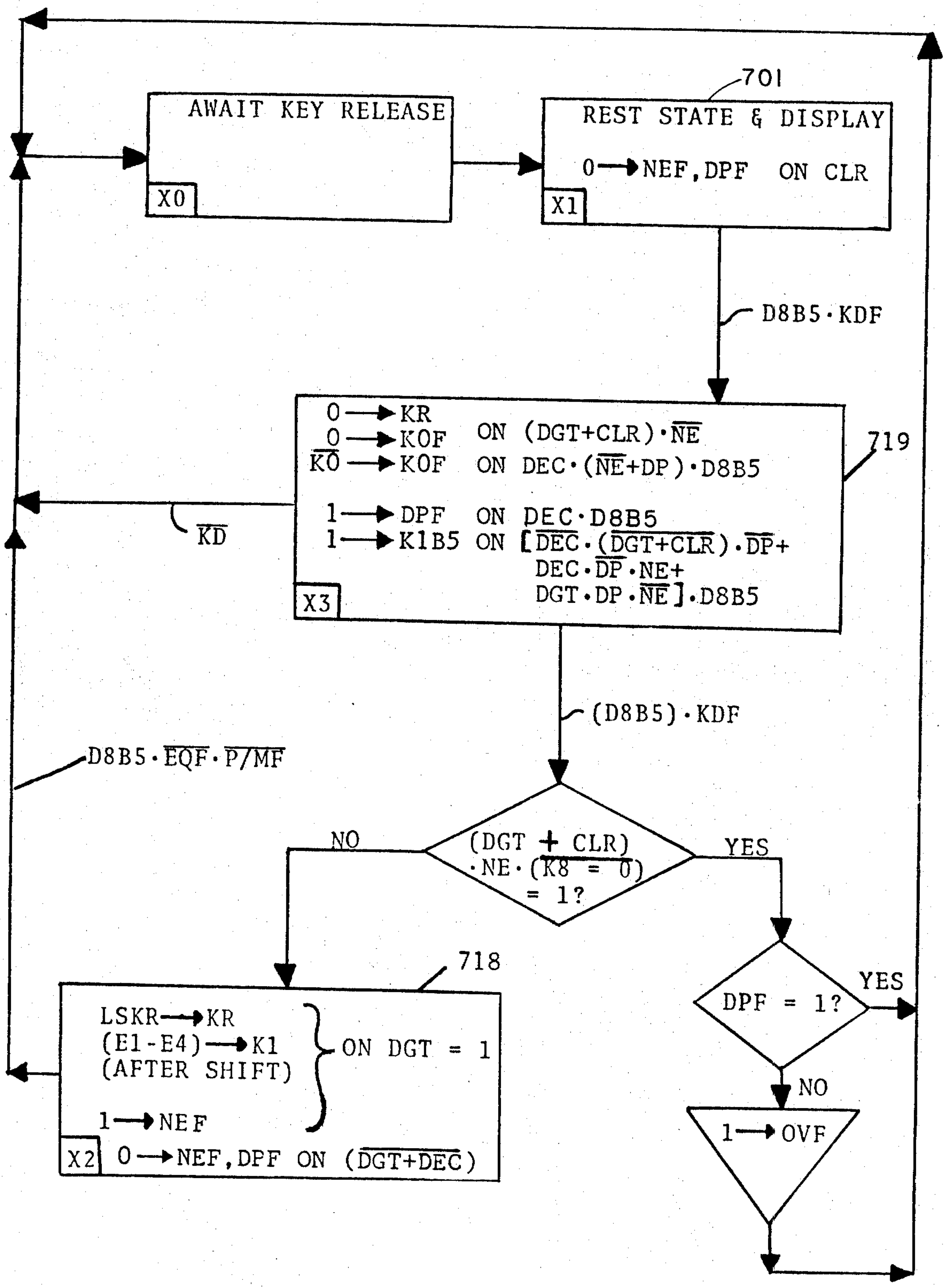
FIG. 7 is a block diagram of an entry routine modified according to the second embodiment and defining the functions provided by the structure of FIG. 6.

It is possible, of course, to have successive further depressions of the decimal point key 24 behave as a sign change control rather than a negative sign selector, that is, instead of merely setting flip-flop 401 such that the signal on line 402 gives a negative sign indication by becoming "true , successive depressions may serve to complement the output, alternating between positive and negative sign indications at each new depression. Circuitry for such operation is shown in FIG. 6, an alternative embodiment having some further modifications to make the sign change feature more useful. As mentioned originally, miniature calculators not only are limited in their keyboard space, but also in their display space and, therefore, often show only the contents of one register (as is the case for the chosen calculator) which may be the results of arithmetic of transfer operations. These results should be usable in succeeding calculations with the possibility of sign change, that is, a change in sign should be possible regardless of whether the quantity displayed originated in keyboard 21 or in the arithmetic portions of calculator 20. Accordingly, FIG. 7 shows a correspondingly modified version of the flow chart of FIG. 5 for a second embodiment of the invention. It will be noted that during state X3 — that is, in the box labeled 719 — the depression of either a digit key 23 or the clear key 25*c* with the New Entry flip-flop 79 in its reset condition will now result in clearing K Reg. 40 and resetting sign flip-flop KOF, though not in resetting decimal point flip-flop DPF. Conversely, depression of the decimal point key 24 after depression of a function key 25*a–g* or the decimal point key 24 itself will not cause preclearance, but will now result in setting the decimal point flip-flop DPF and complementation of the sign flip-flop KOF, that is, the output KO will be set to the value of its inverse KO. Further, if the decimal point key 24 is depressed that second time, the condition DP then being indicated as the state of the decimal point flip-flop DPF, the state of the sign flip-flop KOF will again be complemented and this will be repeated with each successive depression of the decimal point key. Note then that in this second embodiment, one or more depressions of the decimal point key will do nothing except to set the decimal point flip-flop DPF on the first depression and change the state of the sign flip-flop KOF on each depression. If, however, a digit key follows the decimal point key, then this is an indication that instead of a sign change the operator intended the entry of a fractional digital quantity. Accordingly, the first digit entry following a decimal point key depression must clear the old number in the display register, reset the KOF flip-flop to show a positive sign (since the preceding decimal point key depression must be reinterpreted as a true decimal point entry rather than a sign change), and lastly, enter a decimal point to the left of the digit being entered in the K1 digit position, that is, the decimal point must appear in K2B5. Furthermore, because of this more complex dual function of the decimal point key 24, resetting of decimal point flip-flop 70 cannot now be done early in state X3 as was shown by the 0 → DPF term in box 19 of FIG. 5. This resetting is now performed in state X1 as part of the operation initiated by clear key 25*c*, as shown by the term 0 → DPF in box 701 of FIG. 7, and also upon depression of a function key 25*a–g* (redundantly including clear key 25*c*) in state X2, as shown in box 718 of FIG. 7. Whenever a digit key is depressed, of course, the New Entry flip-flop 79 will be set toward the end of the routine as shown in box 718 of FIG. 7 where a 1 → NEF term becomes effective whenever the signal "DGT" is present. It will be noted from FIG. 7 that in this second embodiment, setting of the New Entry flip-flop 79 does not occur on depression of decimal point key 24, thus differentiating from the operations shown in the corresponding box 18 of FIG. 5.

The structure for implementing the flow chart of FIG. 7 is shown in FIG. 6. As before, flip-flop 401 is sampled at D8B5 time, but a three-input AND gate 601 and the feedback input on line 408a are now connected to the data input D of flip-flop 401 through "Exclusive OR" gating 602 (comprising an AND gate and a NOR gate as inputs to an OR gate connected to the D input) such that when there is an output from gate 601 the state of flip-flop 401 is complemented (through the AND gate of 612) at D8B5, whereas the state of the flip-flop is recirculated (through the NOR gate of 612) when sampled at every other D8B5, in known fashion. The three inputs to AND gate 601 are the X3 input on line 406; the decimal signal DEC on line 201 (connected to gate 601 via line 407) originating upon depression of a decimal point key 24 (FIG. 2), both as before in FIG. 4; and lastly the output of a two-input OR gate 603 having as its inputs the signals DP and $\overline{NE}$ from the set side of flip-flop 70 and the reset side of flip-flop 79, respectively.

In addition to the changes in the gating to flip-flop 401, it will be noted in FIG. 6 that OR gate 5 which combined the output of OR gate 77 with the decimal signal DEC from the decimal point key 24 (FIG. 2) has been removed to conform with the changes in preclearance required according to the modifications in box 719 of flow chart of FIG. 7. The output of OR gate 77 is still connected to a three-input AND gate 605, which is similar to AND gate 78 in that gate 605 causes clearance of K Reg. 40 and resetting of flip-flop 401 through OR gate 404, as before, but does so under different circumstances.

A further change has to do with entry of the decimal point to the left of the digit when a decimal point key depression is followed by a digit key depression, thus indicating that the desired effect was the entry of a fractional number rather than complementation of the quantity in K Reg. 40 which was being displayed. For this purpose, another three-input AND gate 606 is provided which has as inputs the digit signal DGT from OR gate 17 of FIG. 2, the signal $\overline{NE}$ from the reset side of flip-flop 79, and the signal DP from the set side of flip-flop 70. The gate 606 is connected to "1 → K1B5," the decimal point entry line 410, via a line 607 to a three-input OR gate 608, the output of gate 608 being connected as one of two inputs to AND gate 609, the output of which is connected, in turn, to the decimal point entry block 41 via line 410, as mentioned above. The other input to AND gate 609 is connected to another two-input AND gate 610, a signal from which enables gate 609 during state X3 at D8B5 time. It will thus be evident that the elements 606-610 comprise structure corresponding to the third term of the fifth rule in box 719, i.e., DGT · DP·$\overline{NE}$, at the timing signal D8B5. The output of AND gate 606 connected to logic 41 controls the entry of a "one" in the fifth bit position of the first order of K Reg. during state X3. At D8B5 time of state X2, because of a left shift caused by the DGT signal from OR gate 17 of FIG. 2, the fifth bit of this first order of K Reg. 40 becomes present at the KRS output 38 of the 35 bit delay portion of K Reg. 40 at D1B5, that is, one digit time after D8B5. Accordingly, the entry of a one in the fifth bit position of K1B5 during X3 corresponds to entry of a decimal point to the left of the bit of the digit entered into buffer register 42 in parallel through the entry gating 27 at D8B5 time after the shift in state X2. Thus, under these conditions the signal DGT will not only enter the digit, but also the decimal point corresponding to the previous depression of decimal point key 24.

As to the other terms of the rule in box 719 relating to entry of the decimal, i.e., 1 → K1B5, the first of these terms is the automatic decimal point entry on depression of a function key. As mentioned with respect to FIG. 4, the expression ($\overline{DGT+CLR}$) covers both manual and automatic decimal point entry, both the function keys 25*a,b* and *d–g* and the decimal point key 24 being effective. In this second embodiment, an initial depression of the latter key does not enter a decimal point, hence the first term is modofied by addition of $\overline{DEC}$. The second term of this rule allows for entry of the decimal during entry of a number, i.e., with flip-flop 79 in its set condition. The logic to provide the foregoing comprises (in addition to OR gate 608 and AND gates 609 and 610 described above) two three-input AND gates 602 and 611 both connected to OR gate 608, and the former corresponding to the second term of the rule, while the latter corresponds to the first term.

The remainder of the logic in FIG. 6 is the same as that for FIG. 4, except for the gating to reset flip-flops 70 and 79, and thus only this last need be discussed. Two identical three-input OR gates 616 and 615 are connected to the reset inputs of flip-flops 70 and 79, respectively, the inputs to these gates being CLR on line 204 connected to the switch (not numbered) associated with clear key 25*c*, the output of an AND gate 614, and the ICC signal previously described. The AND gate 614 has two inputs, one from the X2 state of Sequence Control 35 (FIG. 3) and the other from a two-input NOR gate 613. The inputs to NOR gate 613 come from the lines 205,201 labeled DGT and DEC and connected, respectively, to OR gate 17 and the switch (FIG. 2, not numbered) operated by decimal point key 24. The output of NOR gate 613 will, therefore, be true except when any digit key 23 or decimal point key 24 has been depressed.

Figure 9:
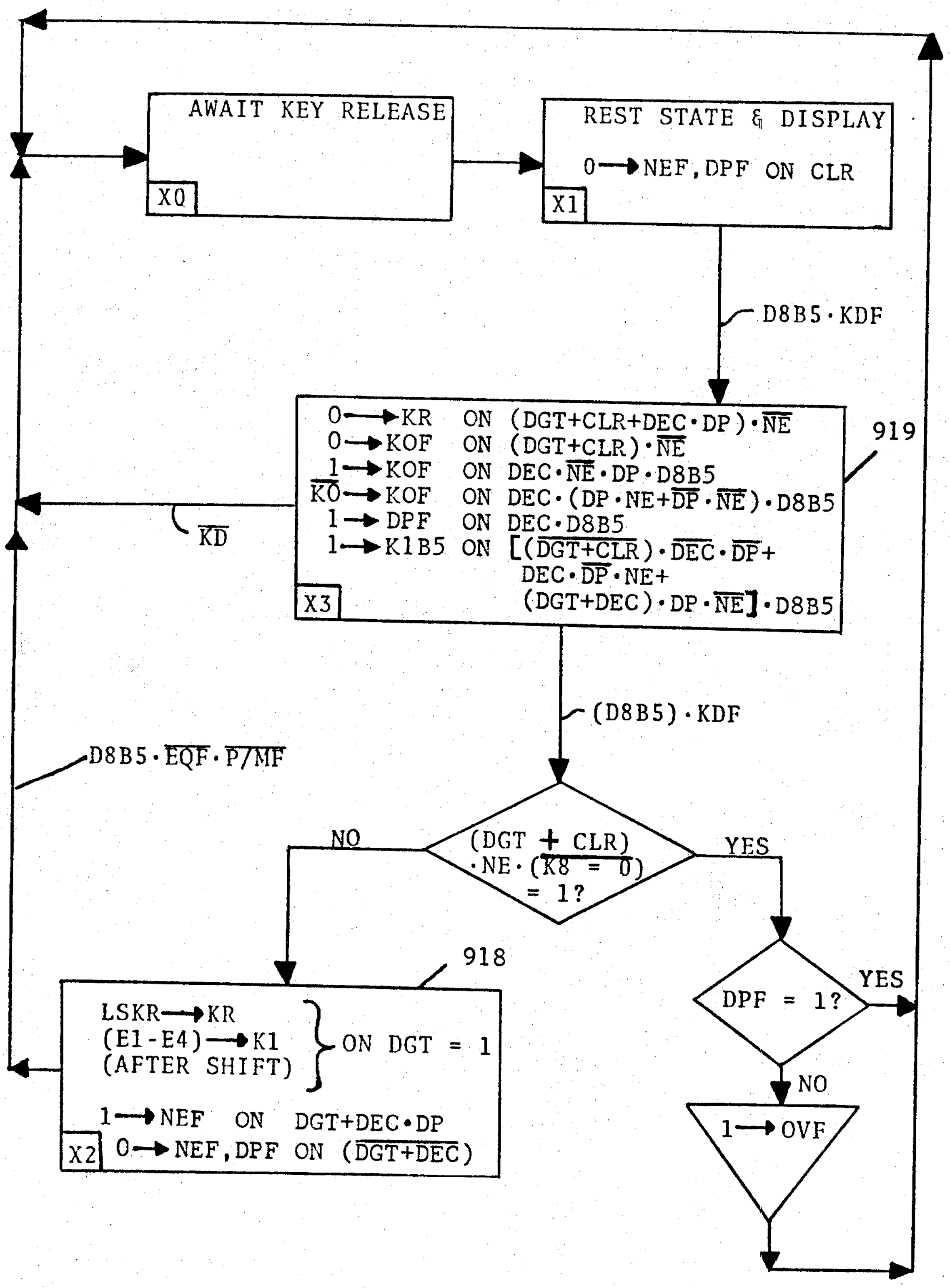
FIG. 9 is a block diagram of an entry routine modified according to the third embodiment and defining the functions provided by the structure of FIG. 8.

According to the preceding embodiment, successive depressions of the decimal point key merely result in the complementation and recomplementation of flip-flop 401. This, however, might not be desirable because it does not allow for the case where the operator's depression of a decimal point key twice in succession during the entry of a fractional digit should be interpreted as having been made for purposes of identifying a negative fractional entry. Accordingly, as a third embodiment, in FIG. 8 there is shown an alternative structure which modofies that of FIG. 6 to provide for only a single complementation upon depression of a decimal point key initially, but with clearance of the keyboard Reg. 40 and entry of a negative sign in the KOF flip-flop 401 upon a succeeding depression of a decimal point key 24. The subsequent depression of a digit key to begin the entry of the digits of the fractional number then causes entry of the decimal point and the first digit of the number in fashion somewhat similar to that shown for FIGS. 6 and 7. Should the decimal point key 24 be depressed a third time, but after depression of a digit key 23 signalling a new entry, this would be interpreted as an instruction to change the sign of the number entered. FIG. 8 shows the structure and a corresponding flow chart is shown in FIG. 9 with respect to operation according to this third embodiment. The main significance of the above-mentioned changes is that complementation of KOF flip-flop 401 now can occur only if it is the first depression of a decimal point key 24 before initiating a new entry (change of sign of a result) or the second (or further) depression of key 24 after an entry (change of sign of the entry). This corresponds, therefore, to simultaneous presence of the signals ($\overline{NE} \cdot \overline{DP} + NE \cdot DP$), as will now be explained.

As seen in FIG. 8, the sign flip-flop 401 — sampled at D8B5 time, as before — now has the Exclusive OR gate combination 612 connected to two data inputs supplied through an OR gate 801. The OR gate inputs come from an AND gate 802 and an AND gate 804.

The AND gate 802, in fashion somewhat similar to AND gate 601, provides for complementation of the sign flip-flop 401 whenever the decimal point key 24 is depressed for the first time and prior to any depression of a digit key 23 signifying a new entry, or when key 24 is depressed for a second time and subsequent to depression of a digit key 23 signifying a new entry. Both of these changes occur during the first state of the entry routine (that is, during X3). Accordingly, two of the three inputs to AND gate 802 are X3 and the signal "DEC" on line 201 indicating a depression of decimal point key 24. The other input to gate 802 is connected to an OR gate 803 having two inputs coming from a pair of two-input AND gates 805 and 806. The former AND gate is supplied with the inverted output $\overline{DP}$ of flip-flop 70 and the inverted output $\overline{NE}$ of flip-flop 79, whereas the latter AND gate has the direct output DP of flip-flop 70 and the direct output NE of flip-flop 79. This structure will then provide, it is clear, for complementation of the sign flip-flop 401 under the conditions prescribed by the fourth rule of box 919 which defines the operations in state X3 according to this third embodiment.

As stated above, the second input to OR gate 801 comes from an AND gate 804 having as its three inputs the output of another AND gate 807, the inverted output $\overline{NE}$ of flip-flop 79, and the signal X3 indicating the appropriate state of the sequence. AND gate 807 has two inputs, one input being DEC on line 201 coming from the switch (not numbered) associated with decimal point key 24 (FIG. 2), the signal on line 201 becoming true upon depression of key 24. The other input to gate 807 is connected to the set side of flip-flop 70 via line 808 and the signal thereon becomes true whenever that flip-flop is in its set condition. The foregoing structure provides for operation according to the third rule in box 919 as has been described.

In addition to the above-mentioned differences between the algorithms of the entry routines shown in FIGS. 7 and 9 for the second and third embodiments of sign control by means of a dual function decimal point key according to the invention, several other differences are of interest. It will be recalled that in the third embodiment, two successive depressions of decimal point key 24 are to indicate a new entry (negative and fractional in character) rather than recomplementation, and hence that the quantity in Reg. 40 is to be cleared. The first rule in box 919, therefore, differs from that in box 719 by virtue of the added term "DEC×DP" within the parentheses, requiring the desired clearance on successive depressions of key 24 prior to initiating entry of a new number. This is provided in FIG. 8 by gating comprising an OR gate 811 with its two inputs connected respectively to three-input AND gate 605 and to a three-input AND gate 804. The AND gate 605 is the same as in FIG. 6, while AND gate 804 has its three-inputs connected respectively to the line X3, the reset side of flip-flop 79 and the output of an AND gate 807 having two inputs, namely, DEC on line 201 and the set side of flip-flop 70.

The rule for insertion of the decimal point in K1B5 is the same in box 919 as in box 719 except for the third term which differs in that depression of either a digit key 23 or the decimal point key 24 subsequent to a depression of decimal point key 24, but prior to entry of a new number, must cause that insertion. This is provided for in FIG. 8 by OR gate 809 connected as a third input to AND gate 606 of the decimal point insertion elements 606–610 (OR gate 608 being split into two parts in FIG. 8). The inputs to OR gate 809 are the DGT output of OR gate 17 on line 205 and DEC on line 201 connected to the switch associated with the decimal point key 24.

Similarly, the data input D to flip-flop 79 occurs through an OR gate 810 which has one input connected to DGT, the output of OR gate 17 on line 205, and the other of its two inputs connected to the output of AND gate 807 (DEC×DP). Thus, either a single depression of a digit key 24 or two successive depressions of decimal point key 24 are effective to set flip-flop 79 to indicate initiation of entry of a new number. The resetting of flip-flops 70,79 being identical in FIGS. 7 and 9, that implementation need not be discussed again.

Figure 10:
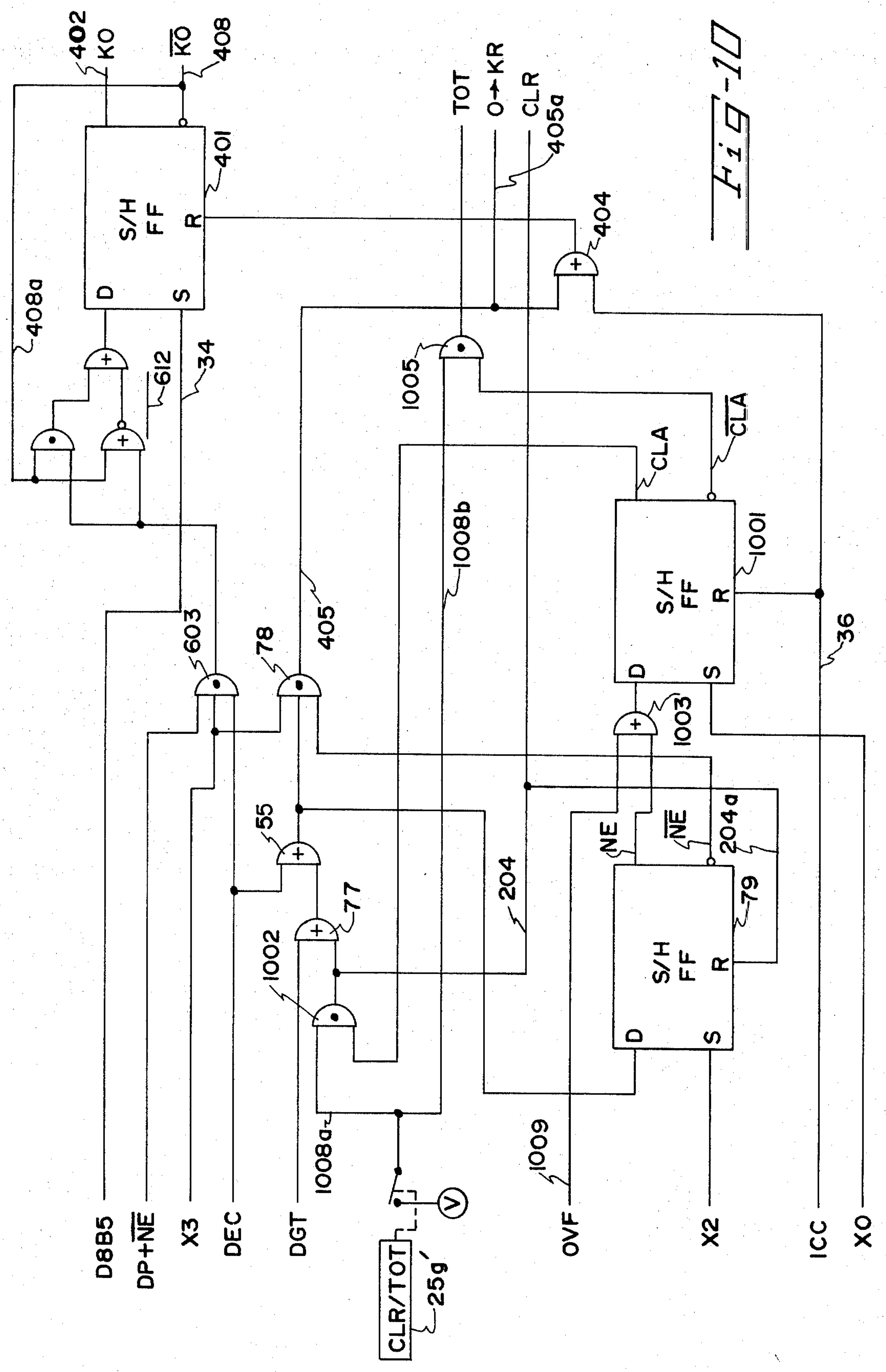
FIG. 10 is a logic diagram of a fourth embodiment of the invention in which a total key is used alternatively as a clear key.

As a fourth embodiment of the invention, there is shown in FIG. 10 structure for provision of a dual-function key acting either as a Total key or as a Clear key. In FIG. 10, a combined CLR/TOT key 25*g'* is connected to gating such that depression of that key normally effects a "Total" operation (that is, the reading out of the contents of an accumulating register, followed by clearance of the accumulating register) but, if operated during an entry, depression of key 25*g'* results in a clearance instead. The logic is somewhat complicated because — as will be recalled — it is NEF flip-flop 79 which indicates the new entry and this flip-flop has a reset input controlled by the "CLR" signal obtained by depression of the Clear key (25*c* in the first three embodiments) and having overriding control of the condition of flip-flop 79. Further, the CLR signal takes effect in any state — usually during X1, the rest state and display. Thus, the signal NE which would distinguish the "Clear" command from the "Total" command achievable with the modified key 25*g'*, would disappear immediately based on the rules defining the relationship between the Clear signal and the flip-flop NEF in the flow diagrams of FIGS. 5, 7 and 9. Accordingly, there is provided a Sample and Hold flip-flop 1001 termed CLA which is sampled in state XO and set whenever flip-flop 79 is set — that is, the output "NE" is true. This is accomplished by connecting the data input D of flip-flop 1001 to the set side of flip-flop 79 through one of two inputs to an OR gate 1003 (the other input being discussed later). Thus, in the XO state of the entry routine accompanying entry of the first digit of a new number, the CLA flip-flop 1001 is set. The signal generated by depression of CLR/TOT key 25*g'* is supplied via lines 1008*a,b* connected as one input to each of a pair of two-input AND gates 1002 and 1005. The former AND gate has its second input connected to the set side of flip-flop 1001, whereas the latter AND gate has its second input connected to the reset side of flip-flop 1001. It is evident then that AND gate 1002 will be enabled when flip-flop 1001 is set, whereas AND gate 1005 will be enabled when flip-flop 1001 is reset. The output of AND gate 1002 is recognizably equivalent to the CLR signal of FIGS. 2 and 4 because it performs the same functions through OR gates 77, 55 and 78, lines 405, 405*a* and gate 404 — namely, clearance of K Reg. 40 and resetting of flip-flop 401. It will be noted that it performs the immediate clearance of flip-flop 79 via lines 204, 204*a* connecting with the overriding reset input of that flip-flop. It does not perform the clearnace of flip-flop 1001 for obvious reasons. Accordingly, flip-flop 1001 remains set until XO time when it samples the NE signal at the OR gate 1003, (which is "zero" at that time assuming the overflow signal OVF on line 1009 to be absent from the other input to OR gate 1003), such that flip-flop 1001 is in turn set to 0.

Because an overflow condition is ordinarily corrected by depression of a Clear key and does not occur solely as a result of entry of excessive digits (being caused also by computations producing results exceeding the capacity of the calculator), the output of an overflow detector — well known in the art — may be connected to the above-mentioned other input of OR gate 1003 and thus set flip-flop 1001 such that corrective depression of key 25*g'* will be effective to generate the desired "Clear" signal at the output of AND gate 1002.

In summary, there have been disclosed improved key controls for minicalculators having a minimal number of keys, the improvement being in the form of four alternative embodiments. A first embodiment discloses a dual-function decimal point key which normally causes entry of a decimal point, but enters a negative sign when depressed a second time during a number entry. The second embodiment discloses a dual-function decimal point key which normally causes entry of a decimal point among the digits of a number being entered, but causes complementation of the sign of a register's contents if depressed before initiating entry of a new number into the register or if depressed successively during entry of that number into the register, with automatic entry of the decimal point if a digit key is depressed subsequent to depression of the decimal point key. The third embodiment discloses a dual-function decimal point key which normally causes entry of a decimal point among the digits of a number being entered, but causes clearance of a register's contents, entry of a decimal point, selection of a negative sign and indication of initiation of a new entry, if depressed twice successively before initiating entry of the digits of a new number, or causes complementation of the sign of the contents of the register if depressed before initiating an entry of a new number, or if depressed successively during entry of that number into the register, with automatic entry of a decimal point if a digit key is depressed subsequent to depression of the decimal point key. The fourth embodiment discloses a dual-function total key, depression of which normally initiates a total-taking operation, but if depressed during entry of the digits of a number, that key initiates a clearance of those digits from the register and the selection of a particular sign for the contents of the register.

In light of the above-described embodiments, it will be evident to those skilled in the art that the present invention is susceptible of other modifications, substitutions, etc. and such are intended to be within the scope of the invention, it being defined only by the appended claims.

What is claimed is:

1. In a calculator having digit keys and a decimal point key, and a register for storing digital information, the combination of a. means responsive to depression of said digit keys to enter corresponding information in said register, b. storage means containing information representative of the sign of the digital information stored in the register, c. a bistable device normally in a first state and settable to a second state in response to depression of said decimal point key, and d. means operable when said bistable device is in said second state and effecting a change in the contents of said sign storage means in response to depression of said decimal point key.

2. The combination of claim 1, wherein said sign change means comprises means to complement the information in said sign storage means.

3. The combination defined in claim 2, further including a new entry detector settable from a first state to a second state indicative of entry of a new number, and wherein a complementation of the contents of said sign storage means occurs in response to depression of said decimal point key with both said bistable device and said entry detector in said first states.

4. The combination defined in claim 2, further including a new entry detector settable from a first state to a second state indicative of entry of a new number, and wherein a complementation of the contents of said sign storage means occurs in response to depression of said decimal point key with both said bistable device and said entry detector in said second states.

5. The combination defined in claim 2, further including a new entry detector normally in a first state and settable to a second state indicative of entry of a new number, and wherein a complementation of the contents of said sign storage means occurs in response to depression of said decimal point key with both said bistable device and said entry detector in said first states and alternatively in response to depression of said decimal point key with both said bistable device and said entry detector in said second states.

6. The combination defined in claim 1, wherein the contents of said sign storage means are normally representative of a positive sign and said sign change means change the contents of said sign storage means to information representative of a negative sign.

7. The combination defined in claim 6, wherein said bistable device is a first one of two bistable devices and said sign storage means comprises the second bistable device, said second bistable device being normally in a first state representative of a positive sign and being settable to a second state reresentative of said negative sign when said first bistable device is in its second state and in response to said decimal point key depression.

8. The combination defined in claim 6, further including a new entry detector normally in a first state and settable to a second state indicative of entry of a new number, and wherein entry of said negative sign in said sign storage means is responsive to depression of said decimal point key with said bistable device in its second state and said new entry detector in its first state and is responsive alternatively to depression of said decimal point key with both said bistable device and said new entry detector in said second states.

9. The combination defined in claim 6, further including a new entry detector normally in a first state and settable to a second state indicative of entry of a new number, and wherein said negative sign change occurs in response to depression of said decimal point key with said bistable device in said second state and said new entry detector in said first state.

10. The combination defined in claim 9, wherein said sign change means includes means to complement the contents of said sign storage means in response to depression of said decimal point key with both said bistable device and said new entry detector in their first states and alternatively in response to depression of said decimal point key with both said bistable device and said new entry detector in their second states.

11. The combination defined in claim 6, further including a new entry detector normally in a first state and settable to a second state indicative of entry of a new number, and wherein entry of said negative sign in said sign storage means is responsive to depression of said decimal point key with said bistable device in its second state and said new entry detector in its first state.

12. The combination defined in claim 11, wherein said sign change means include means to complement the contents of said sign storage means in response to depression of said decimal point key with both said bistable device and said entry detector in said first states.

13. The combination defined in claim 11, wherein said sign change means complement the contents of said sign storage means in response to depression of said decimal point key with both said bistable device and said entry detector in said second states.

14. The combination of claim 6, wherein the calculator has function control keys, including a "Total" key for commanding a total-taking operation, and said register is clearable when a clear signal is generated, and further including a new entry detector normally in a first state and settable to a second state indicative of the entry of a new number into said register, normally disabled means for generating a signal to clear the register, means responsive to the second state of said new entry detector and operable to disable said total-taking command and to enable said clear signal generation means in response to depression of said "Total" key, and means to change the contents of said sign storage means to said normal positive sign in response to said clear signal.

15. The combination of claim 14, further including means operable to set said new entry detector to said first state in response to said clear signal, and wherein said disabling and enabling means comprise a further bistable device normally in a first state and settable to a second state in response to the second state of the new entry detector, said total-taking command being disabled and said clear signal being enabled in response to said further bistable device in said second state.

16. The combination of claim 15, further including means providing a signal upon overflow from said register, and wherein said further bistable device is alternatively settable to its second state in response to said overflow signal.

17. The combination defined in claim 1, further including means for storing information as to the location of the decimal point relative to the digits stored in said register, said means being responsive to depression of said decimal point key.

18. The combination defined in claim 17, wherein said calculator has at least one function key and said decimal point location storing means are alternatively responsive to depression of said function key when said bistable device is in said first state and are operable to effect storage of said decimal point location information.

19. The combination defined in claim 18, further including a new entry detector normally in a first state and settable to a second state indicative of entry of a new number, and means operable when said new entry detector is in said first state and effective to set said bistable device to said first state and to store a particular sign in said sign storage means in response to depression of a said digit key and alternatively in response to depression of said decimal point key.

20. The combination of claim 19, wherein setting of said new entry detector to said second state occurs in response to depression of a said digit key and alternatively in response to depression of said decimal point key.

21. The combination defined in claim 20, wherein depression of said function key sets said new entry detector to said first state.

22. The combination of claim 17, wherein said sign change means complement the information in said sign storage means.

23. The combination defined in claim 22, wherein said calculator has at least one function key and said bistable device is settable to said second state when said bistable device is in said first state and in response to depression of said decimal point key and alternatively in response to depression of said function key.

24. The combination defined in claim 22, further including a new entry detector normally in a first state and settable to a second state indicative of entry of a new number and wherein said sign change means complement the contents of said sign storage means alternatively when said decimal point key is depressed with said new entry detector in its first state.

25. The combination defined in claim 24, wherein said decimal point storing means are responsive to depression of a said digit key when said bistable device is in said second state and said new entry detector is in said first state.

26. The combination defined in claim 25, wherein said decimal point location storing means are alternatively responsive on to depression of said decimal point key when said bistable device is in said first state and said new entry detector is in said second state.

27. The combination defined in claim 26, wherein setting of said new entry of detector is set to said second state occurs in respones to depression of a said digit key.

28. The combination defined in claim 26, wherein said calculator has at least one function key and said decimal point location storing means are alternatively responsive to depression of said function key when said bistable device is in said first state.

29. The combination defined in claim 26, wherein said decimal point location storage means are alternatively responsive to depression of a decimal point key with said bistable device in said second state and said new entry detector is in said first state.

30. The combination defined in claim 29, wherein setting of said new entry detector to said second state occurs in response to depression of a said digit key.

31. The combination defined in claim 30, wherein said claculator has at least one function key, and said decimal point location storage means are alternatively responsive to depression of said function key with said bistable device in said first state.

32. The combination defined in claim 31, wherein setting of said new entry detector to its second state occurs in response to depression of a said digit key and alternatively in response to depression of said decimal point key with said bistable device in the second state.

33. In a calculator having digit keys and function control keys, including a "Total" key for commanding a total-taking operation, and a register storing digital information, the information being clearable when a clear signal is generated, the combination of a new entry detector normally in a first state and settable to a second state indicative of the entry of a new number into said register, normally disabled means for generating a signal to clear the register, and means responsive to the second state of said new entry detector and operable to disable said total-taking command and to enable said clear signal generation means in response to depression of said "Total" key.

34. The combination of claim 33, further including means operable to set said new entry detector to said first state in response to said clear signal, and wherein said disabling and enabling means comprise a bistable device normally in a first state and settable to a second state in response to the second state of the new entry detector, said "total-taking" command being disabled and said clear signal being enabled in response to said bistable device in said second state.

35. The combination of claim 34, further including means providing a signal upon overflow from said register, and wherein said bistable device is alternatively settable to its second state in response to said overflow signal.

* * * * *

UNITED STATES PATENT OFFICE
CERTIFICATE OF CORRECTION

Patent No. 3,762,637 Dated October 2, 1973

Inventor(s) Jorge Hernandez

It is certified that error appears in the above-identified patent and that said Letters Patent are hereby corrected as shown below:

Col. 5, line 42, change "probided" to -- provided --

Col. 7, line 57, after " "one" ", delete the closing parenthesis ")"
line 58, before "as", delete the closing parenthesis ")"
line 59, after "described", insert a period Col. 8, line 41, change "(DGT+CLR+DEC)x$\overline{\text{NE}}$" to
-- (DGT+CLR+DEC)•$\overline{\text{NE}}$ --

Col. 9, line 9, after "arithmetic" change "of" to -- or --
line 29, change "KO" to -- $\overline{\text{KO}}$ --

Col. 11, line 15, change "modofied" to -- modified --
line 53, change "modofies" to -- modifies --

Col. 12, line 65, change "DECxDP" to -- DEC•DP --

Col. 13, line 27, change "(DECxDP)" to -- (DEC•DP) --

Col. 17, line 56, delete "on"

Col. 18, line 2, after "entry", delete "of" and after "detector", delete "is set"
line 3, change "respones" to -- response --
line 14, after "detector", delete "is"
line 19, change "claculator" to -- calculator --

Signed and sealed this 5th day of November 1974.

(SEAL)
Attest:

McCOY M. GIBSON JR.
Attesting Officer

C. MARSHALL DANN
Commissioner of Patents